(12) United States Patent
Shah

(10) Patent No.: US 11,015,568 B2
(45) Date of Patent: May 25, 2021

(54) DYNAMIC IGNITION ENERGY CONTROL

(71) Applicant: Caterpillar Energy Solutions GmbH, Mannheim (DE)

(72) Inventor: Darshit Shah, Mannheim (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 16/429,757

(22) Filed: Jun. 3, 2019

(65) Prior Publication Data
US 2020/0003173 A1 Jan. 2, 2020

(30) Foreign Application Priority Data
Jun. 27, 2018 (EP) .................................... 18180106

(51) Int. Cl.
*F02P 3/00* (2006.01)
*F02P 3/045* (2006.01)
(Continued)

(52) U.S. Cl.
CPC ................. *F02P 3/045* (2013.01); *F02P 3/05* (2013.01); *F02P 13/00* (2013.01)

(58) Field of Classification Search
CPC .... F02P 3/045; F02P 3/05; F02P 13/00; F02P 17/12; F02P 5/151; F02P 5/152;
(Continued)

(56) References Cited

U.S. PATENT DOCUMENTS

| 5,150,300 A | * | 9/1992 | Danno | ................... F02P 5/152 701/101 |
| 5,343,844 A | * | 9/1994 | Fukui | ................. G01M 15/042 123/481 |

(Continued)

FOREIGN PATENT DOCUMENTS

| DE | 4218404 A1 | 12/1993 |
| DE | 102007029953 A1 | 1/2009 |

(Continued)

OTHER PUBLICATIONS

Search Report for related European Application No. 18180106.9; report dated Nov. 30, 2018.

*Primary Examiner* — Phutthiwat Wongwian
*Assistant Examiner* — Sherman D Manley

(57) ABSTRACT

A method for controlling the ignition energy of a sparkplug electrode of an ignition system comprises: providing a base current ($I_{base}$) and a base duration ($D_{base}$) which corresponds to the current and duration, respectively, of a physical model at a fixed engine operating point; multiplying the base current ($I_{base}$) and the base duration ($D_{base}$) with a sparkplug state indicator (SSI) based correction factor and with an engine operating state (EOS) based factor for achieving a final global current ($I_{glo}$) and a final global duration ($D_{glo}$), respectively; and communicating the final global current ($I_{glo}$) and the final global duration ($D_{glo}$) to a control unit for controlling the ignition energy and ignition duration of the sparkplug electrode. Further executing real-time energy control based on misfire flag status and, in the end, making sure that the optimum energy is into application by realizing optimum energy tests.

11 Claims, 9 Drawing Sheets

(51) Int. Cl.
*F02P 3/05* (2006.01)
*F02P 13/00* (2006.01)

(58) Field of Classification Search
CPC ..... F02D 2200/0406; F02D 2200/0414; F02D 2200/1015; F02D 41/0027; F02B 19/12; G01M 15/11
See application file for complete search history.

(56) References Cited

U.S. PATENT DOCUMENTS

| | | | | |
|---|---|---|---|---|
| 5,491,416 | A | * | 2/1996 | Klimstra ................ F02P 17/12 324/393 |
| 5,513,620 | A | * | 5/1996 | Pyko ..................... F02P 3/0456 123/609 |
| 5,875,756 | A | * | 3/1999 | Kamura ............... F02D 41/2422 123/295 |
| 5,909,723 | A | * | 6/1999 | Ichimoto ............... F02P 5/1504 123/406.19 |
| 6,408,242 | B1 | | 6/2002 | Tozzi |
| 6,492,818 | B1 | * | 12/2002 | Downs .................. F02P 3/0838 324/382 |
| 6,736,113 | B1 | * | 5/2004 | Ott ......................... F02P 11/06 123/481 |
| 6,766,243 | B1 | * | 7/2004 | Haussmann .......... F02D 41/266 123/339.11 |
| 9,309,859 | B2 | * | 4/2016 | Louven .................. F02D 41/00 |
| 2004/0085070 | A1 | * | 5/2004 | Daniels ................. F02P 5/1523 324/391 |
| 2006/0030993 | A1 | * | 2/2006 | Goodell .................... F02P 3/02 701/114 |
| 2017/0284358 | A1 | * | 10/2017 | Skowronek ............. F02P 9/002 |

FOREIGN PATENT DOCUMENTS

| | | |
|---|---|---|
| DE | 102011005651 A1 | 9/2012 |
| DE | 102012010177 A1 | 11/2012 |
| DE | 102013010685 A1 | 12/2014 |
| DE | 102015208388 A1 | 11/2016 |
| EP | 0640761 A2 | 3/1995 |
| EP | 1835172 A2 | 9/2007 |
| EP | 3306075 A1 | 4/2018 |
| FR | 2687255 A1 | 8/1993 |
| JP | 2014-017153 A | 1/2014 |

* cited by examiner

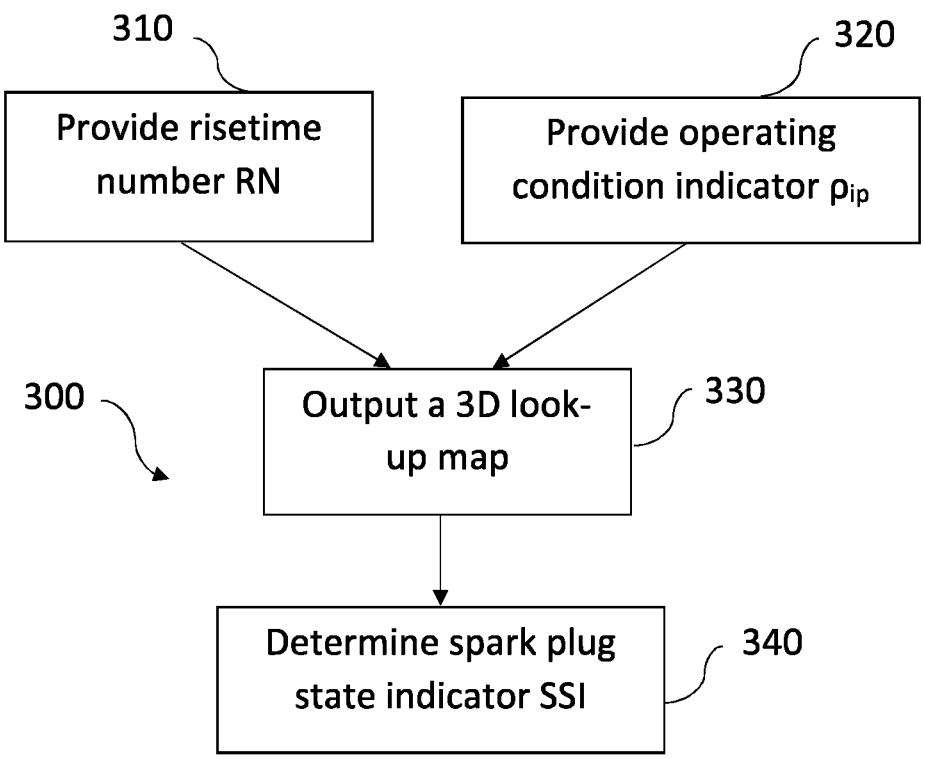

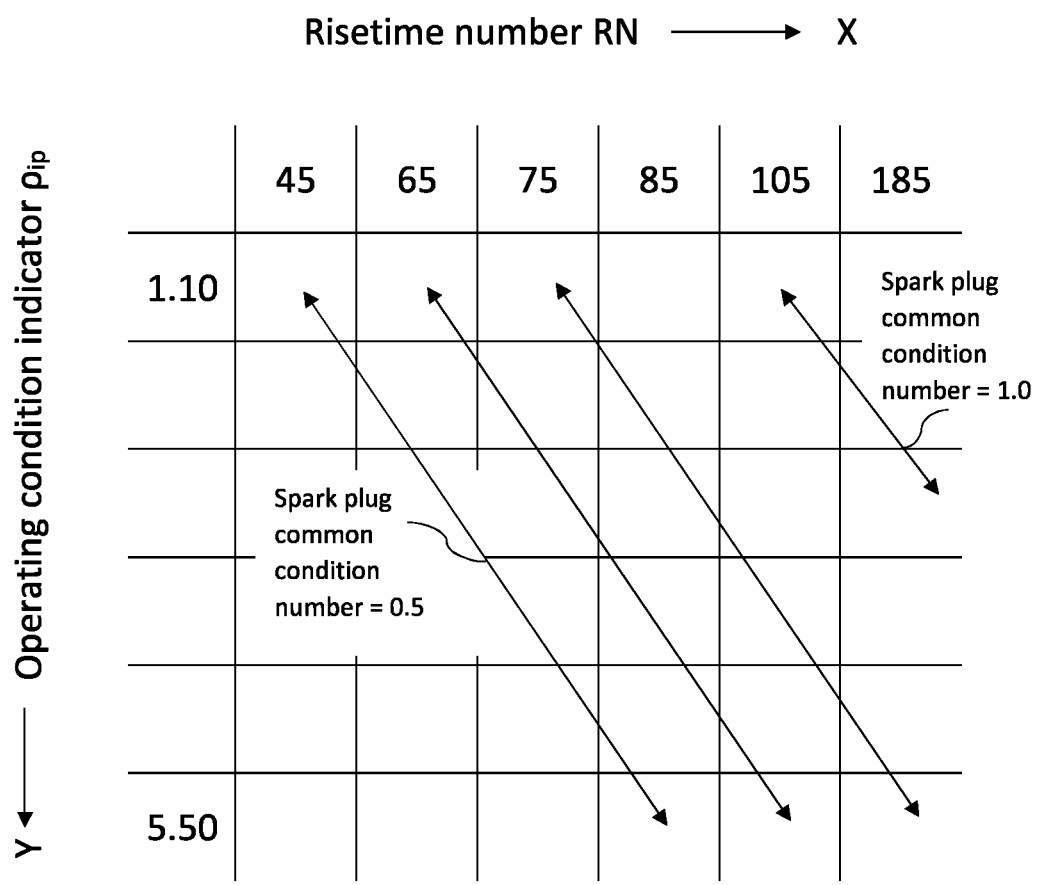

| SSI | $I_{max}$ factor [mA] | $I_{min}$ factor [mA] | D factor [ms] |
|---|---|---|---|
| 0.3 | 1.0 | 1.0 | 1.0 |
| 0.5 | 1.03 | 1.03 | 1.0 |
| 0.7 | 1.05 | 1.05 | 1.05 |
| 0.85 | 1.08 | 1.08 | 1.05 |

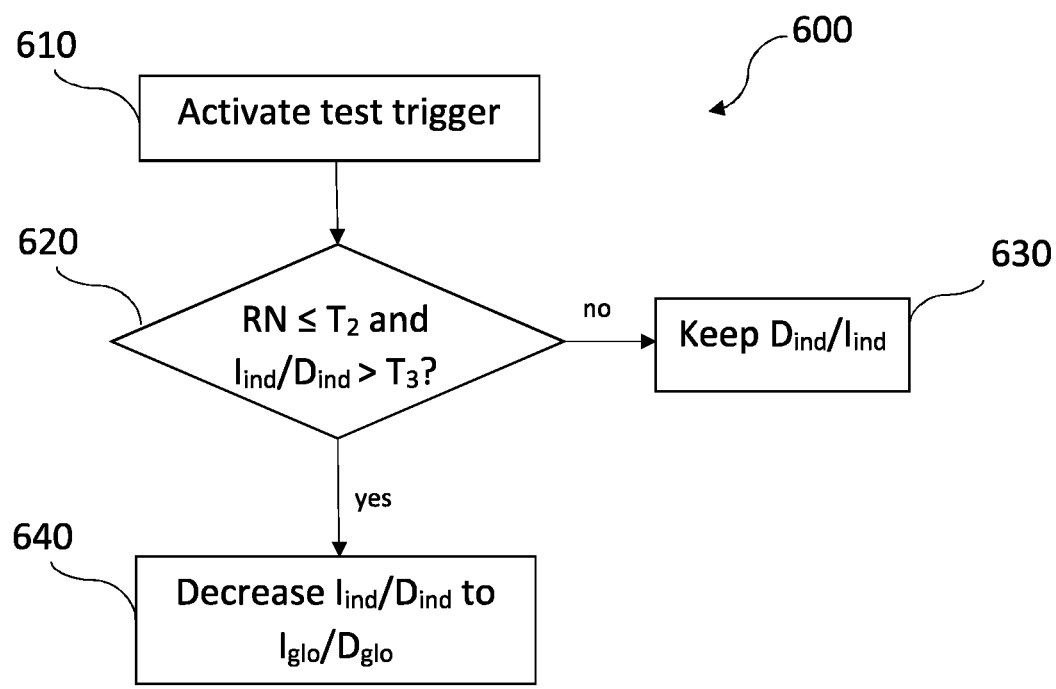

DYNAMIC IGNITION ENERGY CONTROL

CROSS-REFERENCE TO RELATED APPLICATION

This application claims priority under 35 USC § 119 and the Paris Convention to European Patent Application No. 18180106.9 filed on Jun. 27, 2018.

TECHNICAL FIELD

The present disclosure generally relates to an ignition system such as in an internal combustion engine. More particularly, the present disclosure relates to a method for dynamically controlling the ignition energy of the ignition system and an ignition system for an internal combustion engine configured to perform the method for dynamically controlling the ignition current and ignition time.

BACKGROUND

In order to initiate combustion of a compressed fuel-air-mixture in a cylinder of a reciprocating spark-ignition (SI) engine, in particular for engines operating on gaseous fuel, a sparkplug for generating a spark arc based on external ignition energy supply is required. In general, the sparkplug is provided with two electrodes between which the spark arc is to be generated. At present, a fix energy level is used to ignite the fuel-air-mixture inside the cylinder. However, this fix energy level is only optimum for a specific operating condition, a specific state of an ignition coil and a specific state of the sparkplug electrodes. For other operating conditions, states of the ignition coil and states of the sparkplug electrodes than the specific ones, the fix current level or fix duration is not optimum. For example, a current which is higher than required for given operating condition or a duration which is longer than required may lead to higher erosion of the sparkplug electrodes due to higher temperatures, stronger arc and multiple breakdowns. On the other side, a current which is lower than required or a duration which is shorter than required may lead to sparkplug malfunction, leading to poor transient performance or even misfires, and, thus, to a restricted engine operation.

An exemplary apparatus and method for diagnosing and controlling an ignition system of an internal combustion engine is disclosed in U.S. Pat. No. 6,408,242 B1. The apparatus includes an ignition coil controllable by an ignition control circuit, a spark voltage sensor electrically connected to the high tension side of the ignition coil secondary and an ion voltage sensor electrically connected to the low tension side of the ignition coil secondary. A computed processes the ion voltage signal to determine a combustion quality value and a roughness value. If the combustion quality value is outside a predefined range or if the roughness value exceeds a roughness threshold, the computer is operable to adjust the engine fueling, spark timing and/or spark energy.

The present disclosure is directed, at least in part, to improving or overcoming one or more aspects of prior systems.

SUMMARY OF THE DISCLOSURE

In one aspect, a method for controlling the ignition energy of an ignition system, is disclosed. The method comprises the step of providing a base current and a base duration which corresponds to the primary current and ignition duration, respectively, of a physical model at a fixed engine operating point. Further, the method comprises the step of multiplying the base current and the base duration with a sparkplug state indicator based correction factor and with an engine operating state based factor for achieving a final global current and a final global duration, respectively. Finally, the method comprises the step of communicating the final global current and the final global duration to a control unit for controlling the ignition energy. The ignition energy comprises an ignition current and an ignition duration.

In another aspect, an ignition system for an internal combustion engine is disclosed. The ignition system comprises at least one sparkplug, an ignition coil for the at least one sparkplug and a control unit comprising an ignition driver electronically connected to the ignition coil and configured to perform the method according to the above aspect.

In yet another aspect, an internal combustion engine, specifically an internal combustion engine working on gaseous fuel, is disclosed. The internal combustion engine comprises a plurality of cylinders each defining a combustion chamber therein for igniting fuel, a plurality of fuel injectors each one being assigned to a respective cylinder for injecting fuel, and an ignition system according to the above aspect.

In yet another aspect, a computer program is disclosed. The computer-program comprises computer-executable instructions which, when run on a computer, cause the computer to perform the steps of the method according to the above aspect.

Other features and aspects of this disclosure will be apparent from the following description and the accompanying drawings.

BRIEF DESCRIPTION OF THE DRAWINGS

The accompanying drawings, which are incorporated herein and constitute part of the specification, illustrate exemplary embodiments of the disclosure and, together with the description, serve to explain the principles of the disclosure. In the drawings:

FIG. 5 shows a process chart for determining a sparkplug state indicator according to the present disclosure;

FIG. 6 shows different sparkplug states in a 3D look-up map according to the present disclosure;

FIG. 9 shows a process chart for performing individual ignition control according to a second sub-module of the second module of the present disclosure.

DETAILED DESCRIPTION

Figure 1:
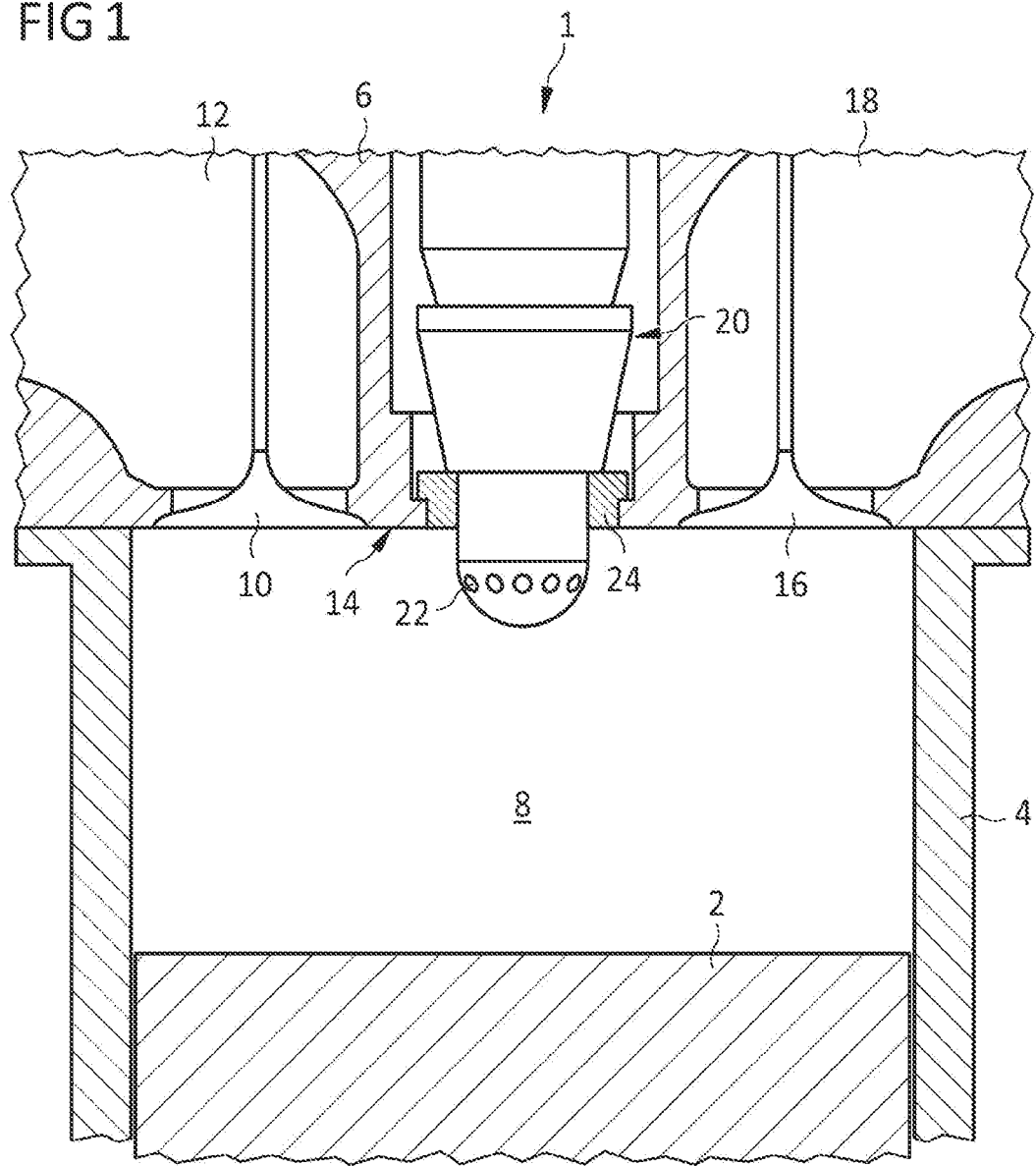
FIG. 1 shows a schematic cut view through a portion of an internal combustion engine that is equipped with a pre-chamber.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that a definite minimum ignition energy by controlling an ignition duration or an ignition current is required to ionize the gas in-between the electrodes of a sparkplug of a reciprocating spark-ignition (SI) engine and to generate a breakdown to ignite a fuel-air-mixture inside a cylinder of the engine. Generally, the ignition of a fuel-air-mixture occurs via a sparkplug and through an ignition coil which consists of a primary coil winding and secondary coil winding. If the ignition driver supplies a current to the primary coil winding, a magnetic field is generated. As soon as current supplying is stopped, the magnetic field breaks down what implies a high voltage in the secondary coil winding generating an ignition spark igniting the fuel-air mixture. Thus, the ignition duration is the time span between starting to supply the primary coil with a current and stopping the current supply. However, a fixed primary ignition current or a fixed ignition duration, i.e., a fixed ignition energy, is just optimum for a specific engine operating constellation. If the ignition energy is higher than required, this could lead to unnecessary burning and erosion of the sparkplug electrodes. On the other side, if the ignition energy is lower than required, the engine operation might be restricted due to high pressures or late ignition angles. Further, low energy could result in spark-plug malfunctions such as engine misfires resulting in a poor engine smoothness and/or poor transient performance Thus, it is essential to control the definite minimum energy by controlling the primary ignition current and the definite minimum duration dependent on the engine operating conditions and the sparkplug state.

In general, the present disclosure suggests a modular algorithm which is comprised of a first module and a second module for determining the required ignition energy, i.e., the ignition current and the required ignition duration for a sparkplug. The algorithm is able to do real-time ignition energy control. Further, dependent on the ignition system configuration and the application, the algorithm may be a feed forward map-based control or a real-time feedback control based on ignition system state and misfire detection. Due to the modular structure, each module adds new functionality and makes the approach more robust and precise under given conditions.

The first module offers real-time ignition system condition based ignition energy control. The algorithm of the first module is active with engine start command. The first module determines a global ignition current and a global ignition duration which is common for all cylinders of the engine independent on the number or the arrangement of cylinders. The second module determines an individual ignition current and an individual ignition duration which may differ for each of the cylinders of the engine or a group of cylinders connected within an ignition driver. The method according to the first module may be performed independently on the second module. The method according to the second module may be performed in conjunction with the method according to the first module only.

The first module represents a method for controlling the ignition energy of an ignition system, wherein a global, overall ignition current and ignition duration is determined which is equal for all cylinders. The method starts with the step of providing a base current and a base duration. The base current and the base duration are determined by calibrating a physical model at a fixed operating point. After providing the base current and base duration, the method proceeds with multiplying the base current and the base duration with a sparkplug state indicator based correction factor and with an engine operating state based factor for achieving a final global current and a final global duration, respectively, which are common for all engine cylinders.

The sparkplug state indicator based correction factor is determined based on the risetime number and an operating condition indicator. In other words, based on a sparkplug state indicator, a gain look-up table comprising characteristic curves for current levels and durations is implemented. This enables real-time global ignition energy control, changing the energy input by scaling the current levels and durations based on the sparkplug state wear level. There is no cylinder individual gain scaling in the first module. It is a feed forward approach.

The risetime number indicates the time required for raising a primary current which is supplied to an ignition coil of the sparkplug from an inactive level to a predetermined level. The risetime number may be a non-dimensional number which is preferably based on a statistical mean value and a standard deviation and variance, respectively, in order to combine the effect of both a mean value and a standard deviation. Non-dimensional numbers generally have the advantage that they allow an assessment of a situation in an easy and quick manner.

The operating condition indicator is configured to indicate or be dependent on an operating condition of the engine. For determining the operating condition indicator various conditions of the internal combustion engine may be considered, such as the operating load, the operating temperatures, the operating pressures, intake air conditions, etc. Preferably, the operating condition indicator corresponds to the density of the fuel-air-mixture in the cylinder at the time of ignition and, thus, corresponds to the mixture density at the time of ignition. This density of the fuel-air mixture may preferably be calculated based on the initial density of the fuel-air-mixture and the ignition angle, i.e., the crank shaft angle at which the ignition of the fuel-air-mixture takes place. The initial density of the fuel-air-mixture may preferably be calculated based on the pressure and the temperature at the intake manifold which are both measured by use of suitable sensors. However, it is noted that the initial density may also be calculated based on other operating conditions of the internal combustion engine, e.g., by means of a mass flow sensor. The ignition angle may be determined in real-time or based on a look-up table.

The sparkplug indicator based correction factor provides a multiplying factor for each of the current and the duration.

The engine operating state based factor is based on the engine operating state which may be transient or stationary and is implemented as a unique flat gain on current levels and duration.

Finally, in the method according to the first module, the final global current and the final global duration are communicated and sent to a control unit for controlling the ignition energy and the ignition duration of the sparkplug electrodes and, thus, for further functional usage and broadcasting. The final global current and the final global duration are limited by driver hardware boundaries to avoid over-demand issues.

It may be preferred that the control unit is configured to control, firstly, the ignition duration of the ignition driver and, then, to control the ignition current of the ignition driver as a procedure to control ignition energy. Longer duration increases the probability of second or multiple breakdowns, which could increase the wear hence for sparkplugs that are worn out. That is, increasing current may also be preferred over increasing duration.

The second module follows the first module and represents a method for controlling the ignition energy, i.e. the ignition current and the ignition duration of a sparkplug electrode of an ignition system for each individual cylinder.

The second module consists of two sub-modules, one for avoiding misfiring and the other one for determining the optimum ignition current and the optimum ignition duration. The method according to the first sub-module may be performed independently on the second sub-module. The method according to the second sub-module may be performed in conjunction with the method according to the first sub-module only.

The first sub-module of the second module represents a method which starts with the step of activating a misfire flag for detecting a misfire in each of the cylinders by use of a misfire detection system (a separate system or the control unit). The misfire flag sets a marker for determining whether a misfire occurred (misfire flag=TRUE) or whether no misfire has occurred (misfire flag=FALSE). If the misfire detection system detects that no misfire has occurred, the final global current and the final global duration determined in the first module are kept and maintained for each individual cylinder. If the misfire detection system detects that a misfire has occurred, the method proceeds with detecting a sparkplug state.

The detection of the sparkplug state serves for evaluating whether a sparkplug is new or worn. For this evaluation, it is determined whether the risetime number is smaller or equal to a first threshold value. The first threshold value corresponds to a sparkplug common condition number which represents a boundary between a new and a worn sparkplug and is stored in a 3D-look-up map in form of a fraction value. The map may be calibrated based on fundamental investigation, accelerated testing and actual behavior of sparkplugs over the time. Further, the calibration of the map may vary depending on the engine type and application and/or the ignition system type. The sparkplug common condition number indicates a state of the sparkplug which is common for different operating conditions and risetime numbers. If the risetime number is smaller or equal to the first threshold value, the sparkplug is relatively new. Whereas if the risetime number is larger than the first threshold value, the sparkplug is relatively worn. In case of a new sparkplug, the final global duration is increased up to the misfire detection system detects no longer a misfire, because the electrode gap between the two electrodes of a new sparkplug is relatively small and, thus, the current may stay constant. In case of a worn sparkplug, the final global current is increased up to the misfire detection system detects no longer a misfire, because the electrode gap between the two electrodes of a worn sparkplug is relatively large and, thus, the duration may stay constant.

The levels of the final global current or the final global duration where no misfire occurs any longer are stored in the control unit for each individual cylinder as a final individual current or final individual duration. For each cylinder which requires an adaptation, i.e., for each cylinder which has misfires, dependent on the state of the sparkplug, the final global current or the final global duration stored in the control unit is replaced by the final individual current or the final individual duration, respectively, i.e., the current level or the duration where a misfire no longer occurs.

In other words, the first sub-module of the second module enables a cylinder individual ignition energy control supplementary to the ignition system state based global ignition energy control. Combustion misfire is used as an event feedback to monitor the working in each individual cylinder. A statistical analysis is made for each cylinder in a misfire detection and statistic block. On detection of a misfire, a further cascading test is made in form of a threshold check to figure out if the misfire occurred with a relatively new sparkplug or with a relatively worn out sparkplug. In case of a new sparkplug, the possibility that the mixture was not ignitable is higher, hence the duration would be increased in predefined steps as a first reaction up to a predefined level and then the current levels are increased until the misfire statistics comes back to a non-critical level and the flag is false for that cylinder. For a relatively old, worn out sparkplug, same procedure as above would be carried out with a first reaction as an increase in current levels, followed by an increase in ignition duration.

The second sub-module of the second module represents a method which starts with the step of activating a test trigger for testing at predetermined time intervals whether the final individual current and the final individual duration are unnecessary high. If the risetime number is smaller than or equal to a second threshold value and if the final individual current and the final individual duration are larger than a third threshold associated to the risetime number, decreasing the final individual current and the final individual duration to the final global current and the final global duration, respectively. On the other side, if at least one of the provisions that risetime number is smaller than or equal to a second threshold value and the final individual current and the final individual duration are larger than a third threshold is not met, keeping the final individual current and the final individual duration.

In other words, in the second sub-module of the second module, a check is made whether the system is operating with optimum energy or with unnecessary high energy. A combination of three thresholds is used for the optimum energy test. The risetime number should be below a threshold and the base energy in form of base current levels and ignition duration should be higher than their respective thresholds. If all these conditions are met, a trigger is active and the current and duration will be reduced with rate limiter to the global minimum current level and the global duration determined in the first module based on the sparkplug state and the engine operating state.

The corrections of the ignition current levels and the ignition duration may be limited by hardware safety limiter and finally transmitted to the control unit for further operations and broadcasting. The above-described method comprising the first module only or the first and the second module is a continuous process running from engine start to engine stop command.

After having performed the method of the second sub-module of the second module, the method may return to the first sub-module of the second module and may repeat the methods of detecting a misfire (first sub-module of second module) and determining the optimum energy (second sub-module of second module).

In the following, it is referred to the drawings to explain the general principle of the present disclosure by way of example. FIG. 1 depicts a piston 2 arranged in a cylinder 4 of a portion of an internal combustion engine 1 (not shown in further detail). The cylinder 4 is covered by a cylinder head 6. The piston 2, the cylinder 4, and the cylinder head 6 together define a main combustion chamber 8 of the internal combustion engine 1. The piston 2 is reciprocating in the cylinder 4 to move between a top dead center (TDC) and a bottom dead center (BDC) during operation of the internal combustion engine 1.

For the purpose of describing exemplary embodiments of the present disclosure, the internal combustion engine 1 is considered as a four-stroke stationary or marine internal combustion engine operating at least partly on gaseous fuel such as a gaseous fuel engine or a dual fuel engine. One skilled in the art will appreciate, however, that the internal combustion engine may be any type of engine (turbine, gas, diesel, natural gas, propane, two-stroke, etc.) that would utilize the sparkplug diagnostics as disclosed herein. Furthermore, the internal combustion engine may be of any size, with any number of cylinders, and in any configuration (V-type, in-line, radial, etc.). Moreover, the internal combustion engine may be used to power any machine or other device, including locomotive applications, on-highway trucks or vehicles, off-highway trucks or machines, earth moving equipment, generators, aerospace applications, marine applications, pumps, stationary equipment, or other engine powered applications. The internal combustion engine 1 may use a pre-mixed fuel air mixture supplied to the cylinder 4 via inlet channels, or may directly inject a fuel into the cylinder 4.

The cylinder head 6 includes at least one inlet valve 10, for example a poppet valve. The inlet valve 10 is accommodated in an inlet channel 12 opening in a piston sided face 14 of the cylinder head 6 for supplying a mixture of gaseous fuel and air into the main combustion chamber 8. Similarly, at least one outlet valve 16, for example also a poppet valve, is accommodated in an outlet channel 18 of the cylinder head 6 to guide exhaust gas out of the main combustion chamber 8.

The cylinder head 6 further comprises a pre-chamber assembly 20 A plurality of flow transfer channels 22 fluidly connect the main combustion chamber 8 with an interior of the pre-chamber assembly 20 (not visible in FIG. 1).

The pre-chamber assembly 20 is installed in the cylinder head 6 via a mounting body 24 as shown in FIG. 1. Alternatively, the pre-chamber assembly 20 may be installed in the cylinder head 6 in any other fashion.

Figure 2:
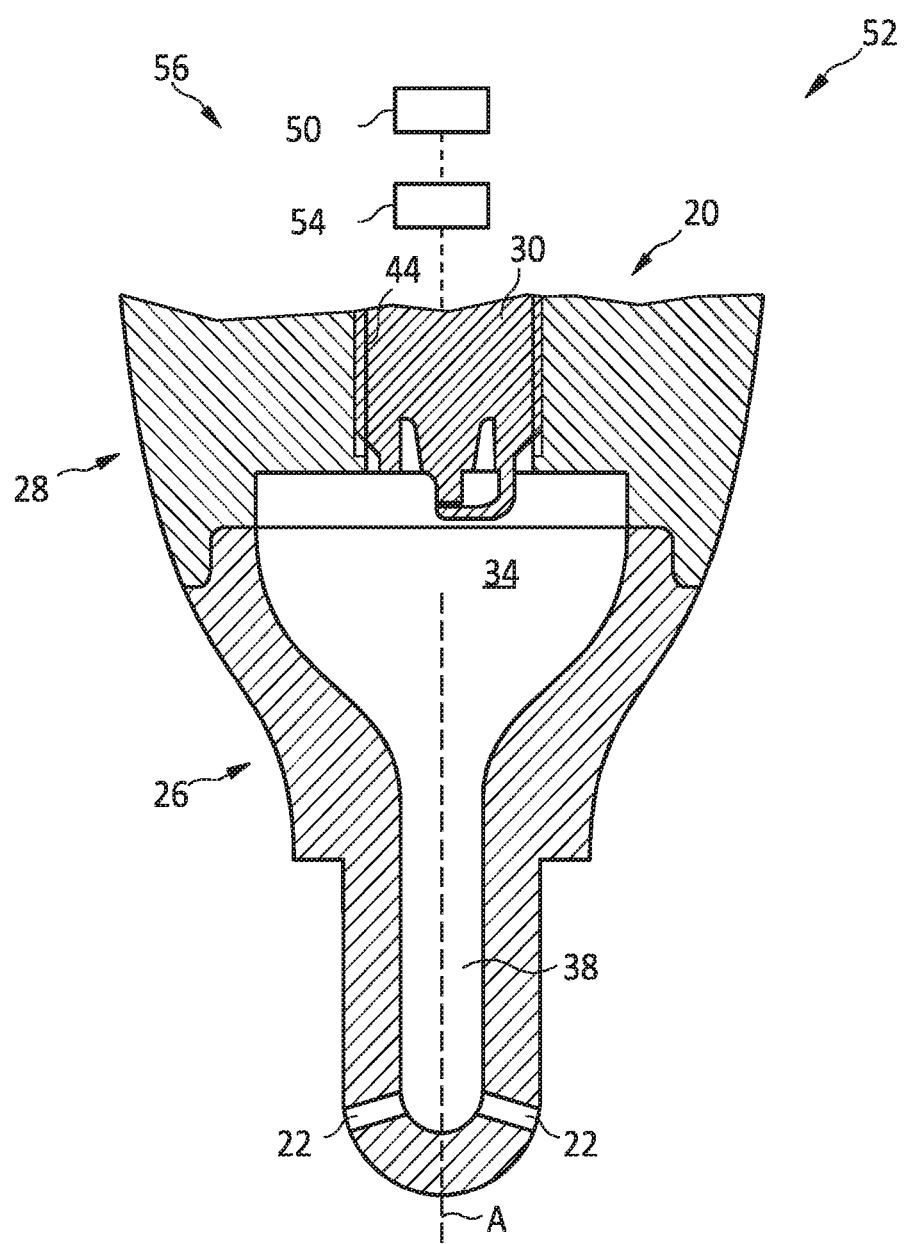
FIG. 2 shows a schematic cut view through an exemplary pre-chamber assembly including a sparkplug.

Referring to FIG. 2, the pre-chamber assembly 20 is shown in a schematic sectional view. The pre-chamber assembly 20 includes a first pre-chamber body 26, a second pre-chamber body 28, and a sparkplug 30. In some embodiments, the pre-chamber assembly 20 may further comprise a fuel supply device for enriching a pre-chamber 34 of the pre-chamber assembly 20.

The first pre-chamber body 26 and the second pre-chamber body 28 are connected to one another. The sparkplug 30 is accommodated in the second pre-chamber body 28

The first pre-chamber body 26 includes and defines the pre-chamber 34, a riser channel 38 and the flow transfer channels 22. In an assembled state, the flow transfer channels 22 fluidly connect an interior of the pre-chamber body 26 (the pre-chamber 34 and the riser channel 38) and the main combustion chamber 8 (FIG. 1).

The pre-chamber 34 extends along a longitudinal axis A of the first pre-chamber body 26, is funnel-shaped, and tapers in direction to the riser channel 38. Alternatively, the pre-chamber 34 may have any other shape such as a cylindrical shape, pyramidal shape, conical shape, and combinations thereof. For example, the pre-chamber 34 may have a volume within a range between 0.1% and 10% of the compression volume of the cylinder 4 (see FIG. 1).

The sparkplug 30 is installed in the pre-chamber assembly 20 so that the sparkplug 30 is operably coupled to the pre-chamber 34. Particularly, electrodes of the sparkplug 30 may reach into the pre-chamber 34 so that a spark between the electrodes ignites a mixture in the pre-chamber 34.

In some embodiments, a pre-chamber 34 may be omitted and/or the sparkplug 30 may reach into the main combustion chamber 8 of the internal combustion engine 1. For example, the sparkplug 30 may be a main combustion chamber sparkplug, a pre-chamber sparkplug, a chamber plug (including an integrated chamber for shielding the electrodes), a ring-type sparkplug, a j-type sparkplug, etc.

An ignition system 56 includes a control unit 50, an ignition coil 54, and the sparkplug 30. In some embodiments, the ignition coil 52 may be integrated into the sparkplug 30.

The control unit 50 is electronically connected to the ignition coil 54 which in turn is electrically connected to the sparkplug 30. The control unit 50 is configured to actuate the ignition system 56. The control unit 50 may be further configured to adapt an operation of the internal combustion engine 1, for example adapting an engine speed, adapting a charge air pressure, adapting a fuel supply, adapting a timing of a fuel supply and an ignition, etc. The control unit 50 and/or the ignition system 56 may be a part of a control system 52 further including the electrical connections to the components.

The control unit 50 may be a single microprocessor or multiple microprocessors that include means for controlling, among others, an operation of various components of the internal combustion engine 1. The control unit 50 may be a general engine control unit (ECU) capable of controlling the internal combustion engine 1 and/or its associated components or a specific engine control unit dedicated to the ignition system 56. The control unit 50 may include all components required to run an application such as, for example, a memory, a secondary storage device, and a processor such as a central processing unit or any other means known in the art for controlling the internal combustion engine 1 and its components. Various other known circuits may be associated with the control unit 50, including power supply circuitry, signal conditioning circuitry, communication circuitry and other appropriate circuitry. The control unit 50 may analyze and compare received and stored data and, based on instructions and data stored in memory or input by a user, determine whether action is required. For example, the control unit 50 may compare received values with target values stored in memory, and, based on the results of the comparison, transmit signals to one or more components to alter the operation status of the same.

The control unit 50 may include any memory device known in the art for storing data relating to an operation of the internal combustion engine 1 and its components. The data may be stored in the form of one or more maps. Each of the maps may be in the form of tables, graphs and/or equations, and may include a compilation of data collected from lab and/or field operation or simulations of the internal combustion engine 1. The maps may be generated by performing instrumented tests on the operation of the internal combustion engine 1 under various operating conditions while varying parameters associated therewith or performing various measurements. The control unit 50 may reference these maps and control operation of one component in response to the desired operation of another component. For example, the maps may contain data on the sparkplug electrode state depending on a specific combination of an operation value of an electrical parameter of the sparkplug 30 and operating conditions of the internal combustion engine 1.

The control unit 50 is further configured to perform the method controlling the ignition current and ignition duration of a sparkplug 30 of an ignition system 56 as disclosed herein, in particular, the method as described in the following with respect to FIGS. 3 to 9.

Figure 3:
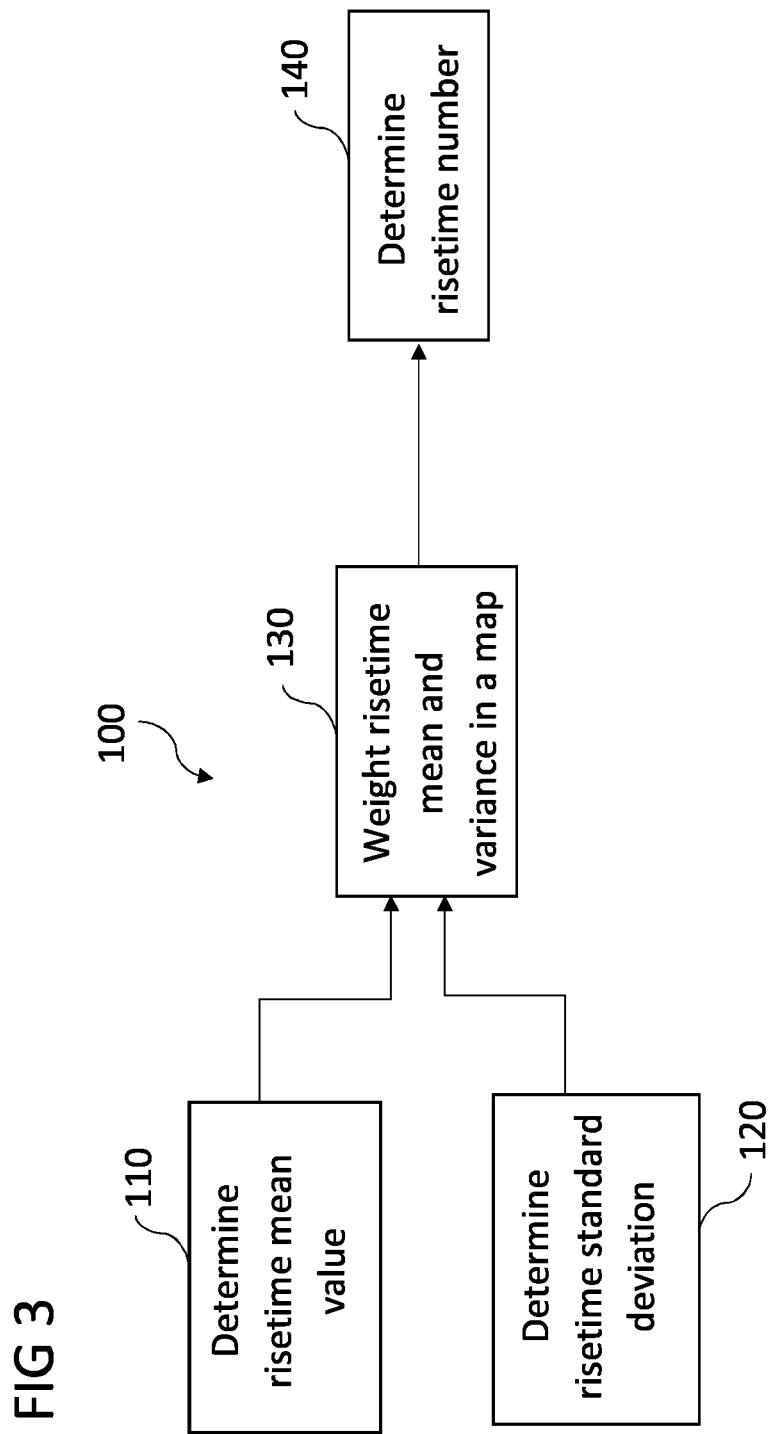
FIG. 3 shows a process chart for determining of a risetime number according to the present disclosure.

FIG. 3 shows a process chart illustrating the method 100 of determining the state of the sparkplug 30, namely determining a risetime number RN in step 140. The risetime number RN is determined based on a determination of a risetime mean value in step 110 and a determination of a risetime standard deviation (variance) in step 120. In general, the risetime is the time which is required for raising the primary current supplied to the ignition coil 54 from an inactive, switched-off level to a predefined level and is measured in microseconds. The predefined level usually corresponds to the level which allows the breakdown of the magnetic field generated by the ignition coil, the generation of a high voltage impulse and a quick transition from glow discharge to arc discharge at the two sparkplug electrodes. The risetime mean value corresponds to an average time which is required to raise the ignition coil current from an inactive level to a predefined level which is necessary to generate the high voltage impulse. The average time is determined over various ignition cycles by the control unit, i.e., over various cycles in which a fuel-air-mixture inside the cylinder is ignited.

After having determined the risetime mean value and the risetime standard deviation, in step 130, both the risetime mean value and the risetime standard deviation are weighted in a map, for example, a characteristic diagram. In step 140, the risetime number RN may be determined based on the map. As both the risetime mean value and the risetime standard deviation are set in relation to each other, the rise time number RN has no dimension what simplifies the assessment of the rise time.

Figure 4:
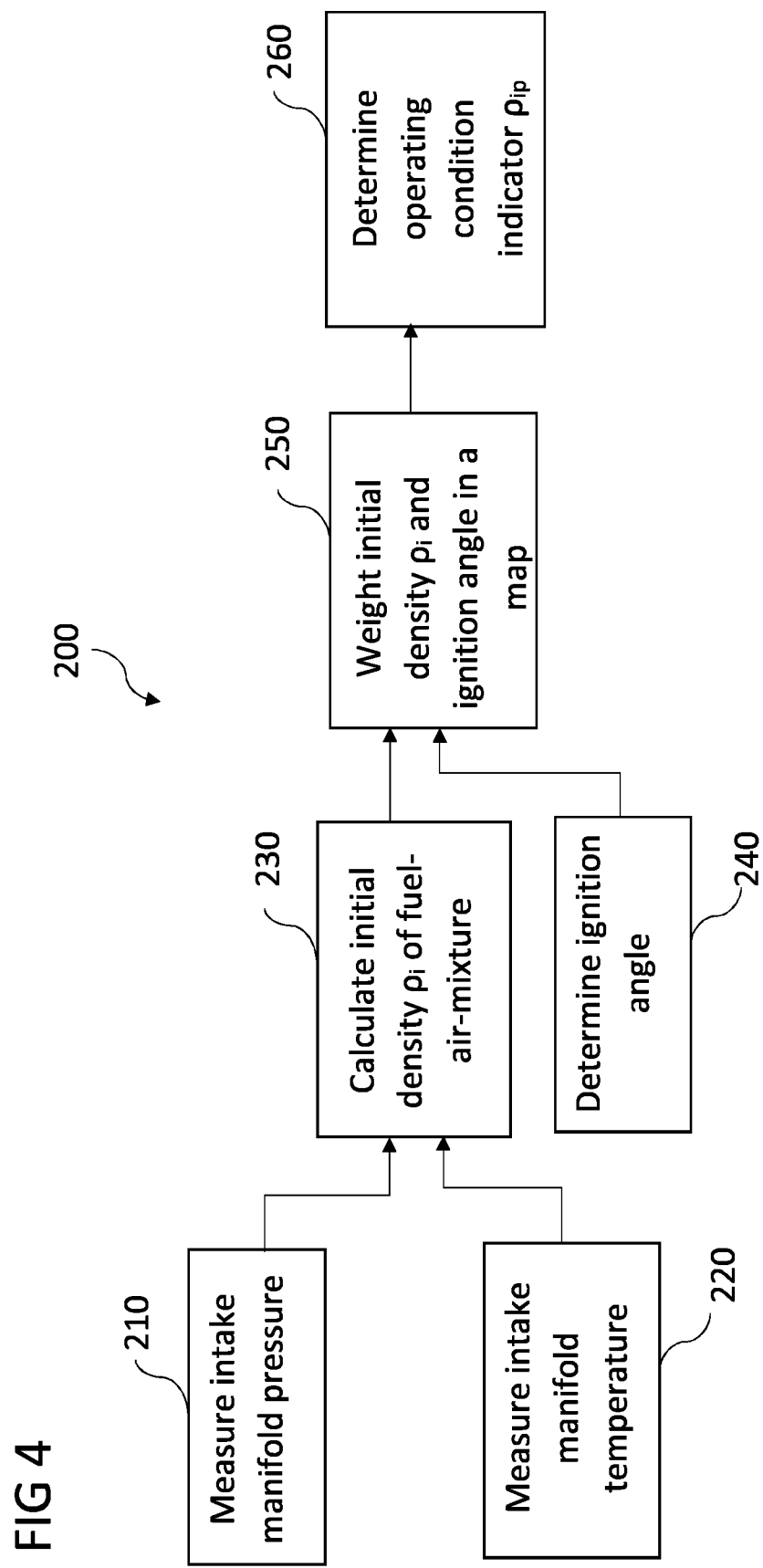
FIG. 4 shows a process chart for determining an operating condition indicator according to the present disclosure.

FIG. 4 shows a process chart illustrating the method 200 of determining the state of the sparkplug 30, namely determining an operating condition indicator $\rho_{ip}$ in step 260. The operating condition indicator $\rho_{ip}$ may correspond to density at the ignition point of the fuel-air-mixture at the ignition time and may be based on the calculation of an initial density $\rho_{ip}$ of the fuel-air-mixture at step 230, i.e., the density of the fuel-air-mixture in intake manifold and the determination of the ignition angle at step 240, i.e., the angle of the crank shaft at which the ignition occurs, usually measured by a suitable sensor device. As shown in FIG. 4, the calculation of the initial density $\rho_i$ in step 230 may be based on the pressure (step 210) and the temperature (step 220) of the fuel-air-mixture at the intake manifold.

After having calculated the initial density $\rho_i$ of the fuel-air-mixture and having determined the ignition angle, the initial density $\rho_i$ and the ignition angle are weighted in a map at step 250 in order to achieve the operating condition indicator $\rho_{ip}$.

FIG. 5 shows a process chart illustrating the method 300 of determining the state of the electrode of the sparkplug 30 according to the present disclosure. For the determination of a sparkplug state indicator SSI, the already determined risetime number RN is taken from the control unit 50 in step 310 and the already determined operating condition indicator is taken from the control unit 50 in step 320. Both the risetime number and the operating condition indicator are outputted in a 3D look-up map in step 330.

An exemplary 3D look-up map is shown in FIG. 6. As can be seen in FIG. 6, the risetime number RN is assigned to the axis of abscissae (X-axis) and the operating condition indicator $\rho_{ip}$ is assigned to the axis of ordinates (Y-axis). In the 3D look-up map, isolines indicate the same state of a sparkplug and, thus, its electrodes, and correspond to a "sparkplug common condition number". The sparkplug common condition number corresponds to a number indicating the state of a sparkplug electrode and is determined by calibration based on fundamental investigation, accelerated testing and/or actual behavior of sparkplugs over time. The breakdown voltage and the risetime is a function of the fuel-air-mixture density in between the two electrodes of the sparkplug and the gap between two electrodes (Paschen's Law). For a given electrode gap the risetime would increase with increasing density. Thus, such isolines represent a same state of electrode gap that represents the dependency of density in-between the electrodes, i.e, the operating load for the engine. The mode of calibration may vary depending on the application or the ignition system type.

Referring again to the example shown in FIG. 6, a new sparkplug may have a sparkplug common condition number of 0.5, whereas a completely worn sparkplug may have a sparkplug common condition number of 1.0. The isoline denoting the new sparkplug is situated leftmost and the isoline denoting the worn sparkplug is situated rightmost in the 3D look-up map shown in FIG. 6. In other words, the more the sparkplug is worn, the more it is positioned and displaced, respectively, to the right in the 3D look-up map of FIG. 6. Referring to the risetime number at the X-axis and the operating condition indicator at the Y-axis, a new sparkplug having a sparkplug common condition number of 0.5 may have a low risetime number of around 45 if the ignition density $\rho_{ip}$ of the fuel-air-mixture is low, e.g., approximately 1.10 as may be in case of idle running of the internal combustion engine. On the other hand side, a new sparkplug having a sparkplug common condition number of 0.5 may have a high risetime number of around 85 if the ignition density $\rho_{ip}$ of the fuel-air-mixture is high, e.g., approximately 5.50 as may be in case of high load operation of the internal combustion engine. To the contrary, a worn sparkplug having a sparkplug common condition number of 1.0 may have a high risetime number of around 105 if the ignition density $\rho_{ip}$ of the fuel-air-mixture is low, e.g., approximately 1.10 as may be in case of idle running of the internal combustion engine and may have a higher risetime number of around 185 if the ignition density $\rho_{ip}$ of the fuel-air-mixture is higher, e.g., approximately 2.50 as may be in case of normal load operation of the internal combustion engine. As shown in the 3D look-up map of FIG. 6, a sparkplug with a completely worn electrode and, thus, a sparkplug common condition number of 1.0 can no longer be used for high load operation of the internal combustion engine, because no spark arc may be generated with a sparkplug having such worn electrodes.

Based on the sparkplug common condition number, the state of the sparkplug is determined, i.e., which sparkplug common condition number applies to the concerned sparkplug.

Figures 7A, 7B:
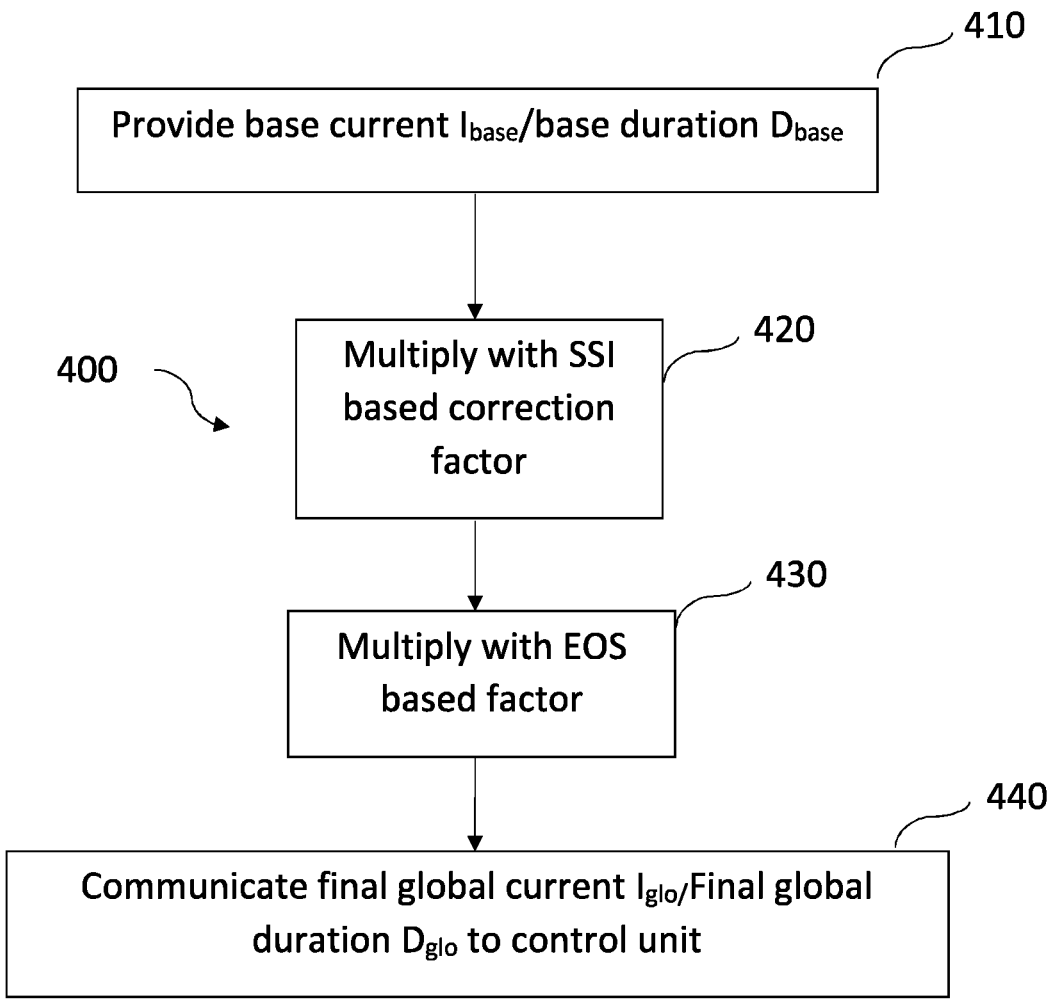
FIG. 7A shows process chart for performing global ignition control according to a first module of o the present disclosure.
FIG. 7B shows a table with sparkplug state indicator based correction factors according to the present disclosure.

In FIG. 7A, a process chart for performing global ignition control is shown. The process chart of FIG. 7A shows a method 400 for controlling the ignition current and the ignition duration for generating a spark at a sparkplug electrode of an ignition system. The method 400 represents the above-mentioned first module. In step 410, a base current $I_{base}$ and a base duration $D_{base}$ are provided. The base current $I_{base}$ and the base duration $D_{base}$ are determined by use of a physical model of an SI engine running at a given operating point, i.e., for example, at a predetermined speed and load. The base current $I_{base}$ and the base duration $D_{base}$ are stored in the control unit 50 for different operating points.

In step 420, the base current $I_{base}$ and the base duration $D_{base}$ are multiplied with a sparkplug state indicator SSI based correction factor to adapt the base current $I_{base}$ and the base duration $D_{base}$ to the current sparkplug state. The sparkplug state indicator SSI based correction factor is shown in the table of FIG. 7B. In the table of FIG. 7B, different values for the sparkplug state indicator SSI are given in the first, leftmost column. In the two columns following the first column in the direction to the right in FIG. 7B, the factors for the maximum current $I_{max}$ and the minimum current $I_{min}$ relating to the different values for the sparkplug state indicator SSI are given (in mA). In the last, rightmost column, the factors for the duration D for the different values for the sparkplug state indicator SSI are given (in ms). The sparkplug indicator SSI is based on the sparkplug common condition number determined in method 300. The factors for the maximum current $I_{max}$, the minimum current $I_{min}$ and the duration D with respect to the different sparkplug state indicators SSI are determined based on calibration of the above-mentioned physical model for determining the base ignition current $I_{base}$ and the base ignition duration $D_{base}$.

In step 430, the base current $I_{base}$ and the base duration $D_{base}$ are further multiplied with an engine operating state EOS based factor. The engine operating state EOS based factor represent the engine operating state, either a stationary state or a transient state. For example, the stationary state may have the engine operating state EOS based factor of 1.0, whereas the transient state may have the engine operating state EOS based factor of 1.2.

In step 440, the base current $I_{base}$ and the base duration $D_{base}$ multiplied with the sparkplug state indicator SSI based correction factor and the engine operating state based factor are communicated as final global current $I_{glo}$ and final global duration $D_{glo}$ to the control unit 50 for global ignition control of all cylinders in the engine. In other words, the final global current $I_{glo}$ and the final global duration $D_{glo}$ communicated to the control unit 50 is applied to all cylinders of the SI engine.

In the following, an exemplary calculation for the final global current $I_{glo}$ and the final global duration $D_{glo}$ is given based on the table shown in FIG. 7B. The maximum base current $I_{base,max}$=16 mA, the minimum base current $I_{base,min}$=12 mA and the base duration $D_{base}$=800 ms, the sparkplug state indicator SSI=0.5 (relatively new sparkplug) and the engine is in a stationary state, $I_{glo,max}$, $I_{glo,min}$ and $D_{glo}$ are calculated as follows:

$I_{glo,max}$=16 mA×1.05×1.0=16.8 mA $I_{glo,max}$=12 mA×1.052×1.0=12.6 mA $D_{glo}$=800 ms×1.0×1.0=800 ms.

Figure 8:
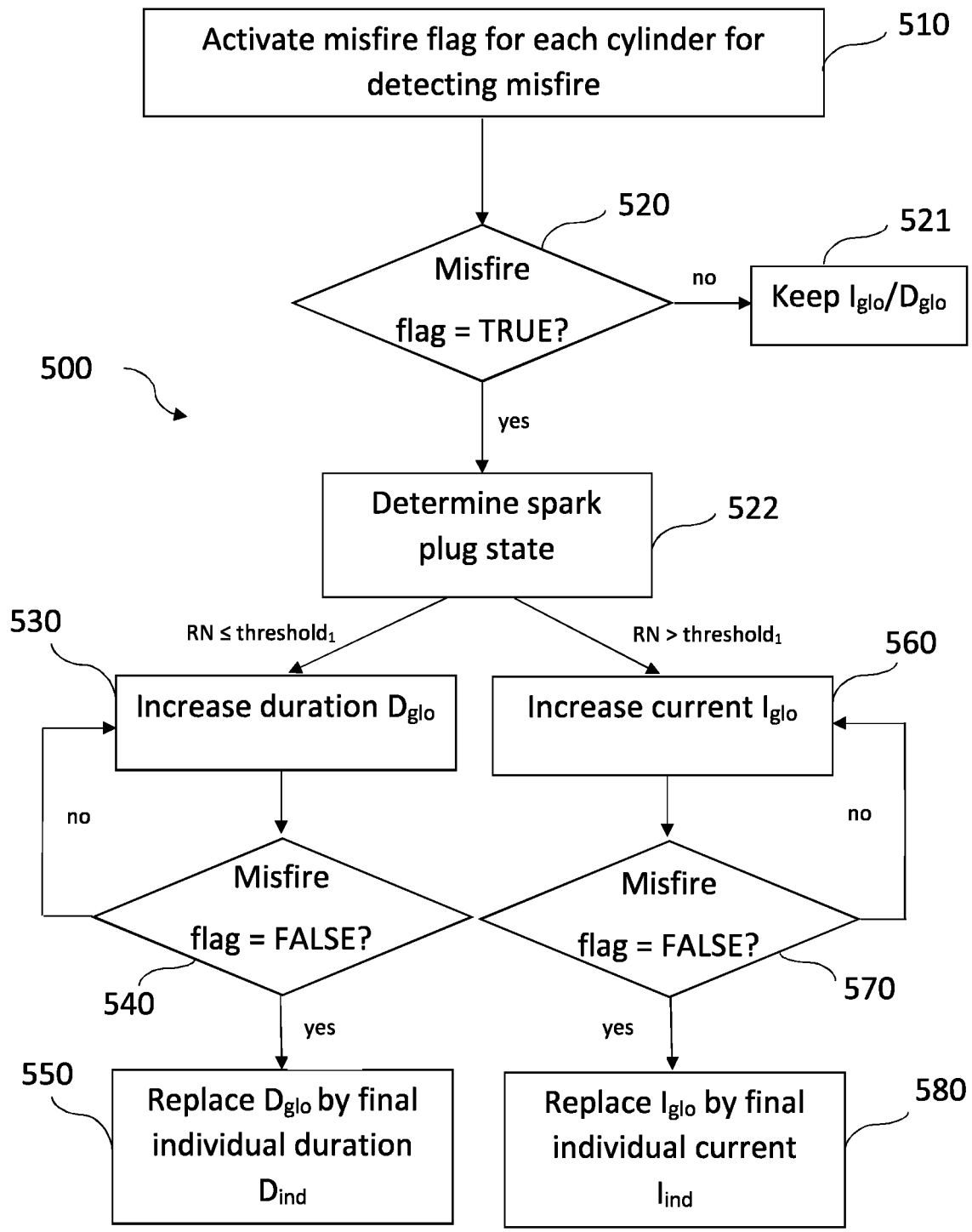
FIG. 8 shows a process chart for performing individual ignition control according to a first sub-module of a second module of the present disclosure.

In FIG. 8, a process chart for performing individual ignition control is shown. Individual ignition control means that each cylinder is individually controlled as for the required current and the duration. The method 500 shown in FIG. 8 represents a first sub-module of a second module.

In step 510, a misfire flag is activated for each of the cylinders and a misfire detection is set for detecting a misfire therein by use of a misfire detection system. Combustion misfire is used as an event feedback to monitor the working in each individual cylinder. A statistical analysis is made for each cylinder in a misfire detection and statistic blocks. There are multiple methods for detecting misfires, e.g., by monitoring in-cylinder pressures, in-cylinder temperatures, ion sensing, rotational moment variations or exhaust pressures and temperatures among others. Accordingly, the misfire detection system may include any sensor suitable for detecting the pressure, temperature, etc. within a cylinder, within an exhaust, etc.

If the misfire detection system does not detect a misfire (NO at step 520), the final global current $I_{glo}$ and the final global duration $D_{glo}$ determined in the first module are optimum. In this case, it is communicated to the control unit that the final global current $I_{glo}$ and the final global duration $D_{glo}$ may be kept and maintained for the respective cylinder.

If the misfire detection system detects a misfire (YES at step 520), the final global current $I_{glo}$ and the final global duration $D_{glo}$ determined in the first module are not optimum. In this case, the current or the duration has to be further increased. In order to determine which one of the current and the duration has to be increased, the sparkplug state is determined in step 522. For determination of the sparkplug state, a first threshold value $T_1$ indicating the boundary between a relatively new sparkplug and a relatively worn sparkplug is defined. The threshold value $T_1$ corresponds to one of the isolines shown in FIG. 6.

If the risetime number RN is smaller than or equal to the threshold $T_1$, the state of the sparkplug is relatively new with less wear at the sparkplug electrodes. In this case, the final global duration $D_{glo}$ is increased in step 530 until the misfire detection system determines that no misfire occurs any longer (YES in step 540). The duration at which no misfire occurs corresponds to the final individual duration $D_{ind}$, is communicated to the control unit 50 and replaces the final global duration $D_{glo}$ for the respective cylinder in step 550.

If the risetime number RN is larger than the threshold $T_1$, the state of the sparkplug is relatively old with a lot of wear at the sparkplug electrodes. In this case, the final global current $I_{glo}$ is increased in step 560 until the misfire detection system determines that no misfire occurs any longer (YES in step 570). The current level at which no misfire occurs corresponds to the final individual current $I_{ind}$, is communicated to the control unit 50 and replaces the final global current $I_{glo}$ for the respective cylinder in step 580.

In FIG. 9, a process chart for performing an optimum energy test is shown. The method 600 shown in FIG. 8 represents a second sub-module of the second module.

In step 610, a test trigger is activated in order to evaluate whether the final individual duration $D_{ind}$ and the final individual current $I_{ind}$, respectively, are sufficient to ensure optimum engine operating conditions, i.e., to avoid misfires, or whether the final individual duration $D_{ind}$ and the final individual current $I_{ind}$, respectively, too high and, thus, result in erosion of the sparkplug electrode and/or sparkplug failures. The test trigger may comprises the time period between two subsequent ignition cycles, but may also comprise any other time period such as a time period of 60 seconds, preferably every 30 seconds, more preferably every 15 seconds. If the test trigger is activated and the conditions are met that the risetime number RN is smaller than or equal to a second threshold value $T_2$($RN \leq T_2$) and the final individual current $I_{ind}$ and the final individual duration $D_{ind}$($I_{ind}$, $D_{ind}$>$T_3$) are larger than a third threshold $T_3$ (YES in step 620), the final individual duration $D_{ind}$ and the final individual current $I_{ind}$, respectively, are too high and, thus, cannot ensure optimum engine operating conditions. Thus, in step 640, it is communicated to the control unit 50 that the final individual duration $D_{ind}$ and the final individual current $I_{ind}$, respectively, is to be decreased to the final global current $I_{glo}$ and the final global duration $D_{glo}$ determined in the first module. The second threshold $T_2$ corresponds to the threshold $T_1$. The third threshold $T_3$ corresponds to a value for a current level and a duration, respectively, associated with the respective risetime number RN determined by use of an experimental map. In other words, $T_3$ is determined from the global current and duration that has been determined by using the method described with respect to FIG. 7A. $T_2$ is defined based on experience values. The test trigger may be activated automatically after completion of the first sub-module of the second module.

If one of the above conditions $R_N \leq T_2$ and $I_{ind}$, $D_{ind}$>$T_3$ is not met (NO in step 620), the final individual duration $D_{ind}$ and the final individual current $I_{ind}$, respectively, are sufficient to ensure optimum ignition system operation for given operating conditions. Thus, in step 630, it is communicated to the control unit 50 that the final individual duration $D_{ind}$ and the final individual current $I_{ind}$, respectively, is to be kept.

Terms such as "about", "around", "approximately", or "substantially" as used herein when referring to a measurable value such as a parameter, an amount, a temporal duration, and the like, is meant to encompass variations of ±10% or less, preferably ±5% or less, more preferably ±1% or less, and still more preferably ±0.1% or less of and from the specified value, insofar as such variations are appropriate to perform in the disclosed invention. It is to be understood that the value to which the modifier "about" refers is itself also specifically, and preferably, disclosed. The recitation of numerical ranges by endpoints includes all numbers and fractions subsumed within the respective ranges, as well as the recited endpoints.

INDUSTRIAL APPLICABILITY

The method and the ignition system as disclosed herein are applicable in internal combustion engines for driving the ignition system and controlling the ignition energy of a sparkplug of an ignition system. Particularly, the methods and control systems as disclosed herein may be applied in large internal combustion engines, in which combustion processes of the cylinders may be globally or individually controlled so that the ignition current and the ignition duration are optimum with respect to the engine operating conditions and the sparkplug state.

Although the preferred embodiments of this invention have been described herein, improvements and modifications may be incorporated without departing from the scope of the following claims.

The invention claimed is:

1. A method for controlling the ignition energy of a sparkplug of an ignition system, the method comprising:
   providing a base current (Ibase) and a base duration (Dbase) which corresponds to the primary current and duration, respectively, of a physical model at a fixed engine operating point;
   multiplying the base current (Ibase) and the base duration (Dbase) with a sparkplug state indicator (SSI) based correction factor and, if the engine is operating in a transient state multiplying with an engine operating state (EOS) based factor for achieving a final global current (Iglo) and a final global duration (Dglo), respectively; and
   communicating the final global current (Iglo) and the final global duration (Dglo) to a control unit for controlling the ignition energy and ignition duration of the sparkplug electrode.

2. A method for controlling the ignition energy of a sparkplug of an ignition system, the method comprising:
   providing a base current (Ibase) and a base duration (Dbase) which corresponds to the primary current and duration, respectively, of a physical model at a fixed engine operating point;
   multiplying the base current (Ibase) and the base duration (Dbase) with a sparkplug state indicator (SSI) based correction factor and with an engine operating state (EOS) based factor for achieving a final global current (Iglo) and a final global duration (Dglo), respectively;
   communicating the final global current (Iglo) and the final global duration (Dglo) to a control unit for controlling the ignition energy and ignition duration of the sparkplug electrode; and
   activating a misfire flag for detecting a misfire in each cylinder by use of a misfire detection system;
   if the misfire detection system detects no misfire, keeping the final global current (Iglo) and the final global duration (Dglo); or
   if the misfire detection system detects a misfire, detecting a sparkplug state, depending on the sparkplug state increasing the duration of the final global current (Iglo) or increasing the final global duration (Dglo) up to a final individual current (Iind) and a final individual duration (Dind), respectively, wherein the misfire detection system detects no misfire, communicating the final individual current (Iind) and the final individual duration (Dind) to the control unit for controlling the ignition energy and ignition duration of the sparkplug electrode by replacing the final global current (Iglo) or the final global duration (Dglo) by the final individual current (Iind) and a final individual duration (Dind), respectively.

3. The method according to claim 2, wherein the sparkplug state is detected based on a risetime number indicating the time required for raising a primary current and hence an ignition energy which is supplied to an ignition coil of the sparkplug from an inactive level to a predetermined level.

4. The method according to claim 3, wherein,
   if the risetime number is smaller than or equal to a first threshold value (T1) which corresponds to the same sparkplug condition at different operating conditions, the final global duration (Dglo) is increased as a measure to increase ignition energy up to the misfire detection system detects a misfire.

5. The method according to claim 3, wherein,
   if the risetime number is larger than a first threshold value (T1) which corresponds to the same sparkplug condition at different operating conditions, the final global current (Iglo) is increased as a measure to increase ignition energy up to the misfire detection system detects a misfire.

6. The method according to claim 5, wherein the method further comprises activating a test trigger for testing at predetermined time intervals whether the final individual current (Iind) and the final individual duration (Dind) are unnecessary high, testing whether the risetime number (RN) is smaller than or equal to a second threshold value (T2) and the final individual current (Iind) and the final individual duration (Dind) are larger than a third threshold (T3) associated to the risetime number (RN), if the risetime number (RN) is smaller than or equal to the second threshold value (T2) and the final individual current (Iind) and the final individual duration (Dind) are larger than the third threshold (T3), decreasing the final individual current (Iind) and the final individual duration (Dind) to the final global current (Iglo) and the final global duration (Dglo), respectively; or if the risetime number (RN) is larger than the second threshold value (T2) and/or the final individual current (Iind) and the final individual duration (Dind) are smaller than or equal to the third threshold (T3), keeping the final individual current (Iind) and the final individual duration (Dind).

7. The method according to claim 6, wherein the test trigger is activated after each completion of the determination of the final individual current (Iind) and the final individual duration (Dind).

8. The method according to claim 2, wherein the sparkplug state indicator (SSI) is determined as a value based on the determined risetime number (RN) and an operating condition indicator which corresponds to an ignition density (ρip) of a fuel-air-mixture at an ignition time.

9. An ignition system for an internal combustion engine, comprising:
at least one sparkplug,
an ignition coil for the at least one sparkplug,
a control unit electrically or electronically connected to the ignition coil and configured to perform the method according to any one of the preceding claims.

10. An internal combustion engine, specifically an internal combustion engine working on gaseous fuel, comprising
a plurality of cylinders each defining a combustion chamber therein for igniting fuel,
a plurality of gas fuel injectors each one being assigned to a respective cylinder for injecting fuel, and
an ignition system according to claim 9.

11. A computer program comprising computer-executable instructions which, when run on a computer, cause the computer to perform the steps of the method of claim 8.

* * * * *